United States Patent Office 3,849,406
Patented Nov. 19, 1974

3,849,406
PYRAZOLINE COMPOUNDS
Horst Aebli, Basel, and Fritz Fleck, Bottmingen, Basel-Land, Switzerland, and Peter Stuart Littlewood, Ilkley, and Alec Victor Mercer, Leeds, England, assignors to Sandoz Ltd., Basel, Switzerland
No Drawing. Filed Oct. 2, 1972, Ser. No. 293,931
Claims priority, application Switzerland, Oct. 8, 1971, 14,717/71; June 20 1972, 9,254/72; June 21, 1972, 9,330/72
Int. Cl. C07d 49/10
U.S. Cl. 260—239.7
12 Claims

ABSTRACT OF THE DISCLOSURE

The invention relates to compounds of formula I,

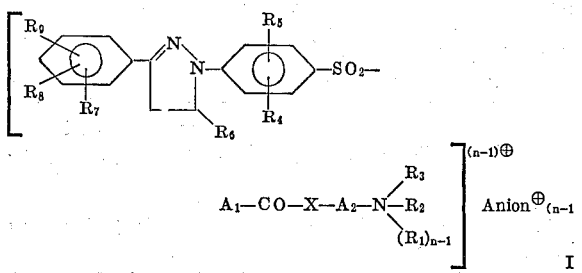

wherein $A_1$ and $A_2$, independently each signifies a lower, optionally substituted alkylene radical, X signifies —O— or —N—
<br>                        |
<br>                       $R_{10}$ wherein
$R_{10}$ signifies a hydrogen atom, or a lower optionally substituted alkyl radical, $R_1$ signifies hydrogen or a lower, optionally substituted alkyl radical, $R_2$ signifies a lower, optionally substituted alkyl, cycloalkyl or aryl radical, or when X signifies

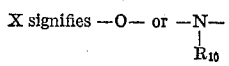

$R_2$ and $R_{10}$ together may form a lower hydrocarbon bridge member, $R_3$ signifies a lower, optionally substituted alkyl radical, or $R_2$ and $R_3$ together with the nitrogen atom signify the radical of a saturated heterocyclic ring, $R_4$ and $R_5$, independently each signifies a hydrogen or halogen atom or a lower, optionally substituted alkyl or alkoxy radical, $R_6$ signifies a hydrogen atom, a lower optionally substituted alkyl radical or an optionally substituted phenyl radical, $R_7$, $R_8$ and $R_9$, independently, each signifies a hydrogen or halogen atom or a lower, optionally substituted alkyl, alkylthio or alkoxy radical, an optionally substituted aryl radical, a cyano group, an optionally substituted alkylsulphonyl, carboxylic acid amide, carboxylic acid ester, sulphonic acid amide or sulphonic acid ester group, or an acylamino group, $n$ signifies one of the integers 1 or 2, and Anion signifies an equivalent of a non-chromophoric anion.

Processes for their production are also disclosed, as well as their use as optical brighteners in organic polymeric materials such as synthetic fibres.

The present invention relates to pyrazoline compounds. The invention provides compounds of formula I,

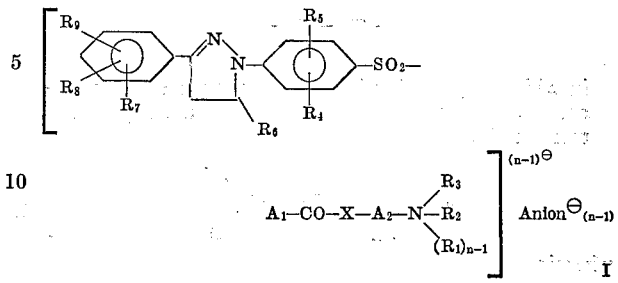

wherein $A_1$ and $A_2$, independently each signifies a lower, optionally substituted alkylene radical, X signifies —O— or —N—
<br>|
<br>$R_{10}$ wherein
$R_{10}$ signifies a hydrogen atom, or a lower optionally substituted alkyl radical, $R_1$ signifies hydrogen or a lower, optionally substituted alkyl radical, $R_2$ signifies a lower, optionally substituted alkyl, cycloalkyl or aryl radical, or when X signifiies —N—,
<br>|
<br>$R_{10}$ $R_2$ and $R_{10}$ together may form a lower hydrocarbon bridge member, $R_3$ signifies a lower, optionally substituted alkyl radical, or $R_2$ and $R_3$ together with the nitrogen atom signify the radical of a saturated heterocyclic ring, $R_4$ and $R_5$, independently each signifies a hydrogen or halogen atom or a lower, optionally substituted alkyl or alkoxy radical, $R_6$ signifies a hydrogen atom, a lower optionally substituted alkyl radical or an optionally substituted phenyl radical, $R_7$, $R_8$ and $R_9$, independently, each signifies a hydrogen or halogen atom or a lower, optionally substituted alkyl, alkylthio or alkoxy radical, an optionally substituted aryl radical, a cyano group, an optionally substituted alkylsulphonyl, carboxylic acid amide, carboxylic acid ester, sulphonic acid amide or sulphonic acid ester group, or an acylamino group, $n$ signifies one of the integers 1 or 2, and Anion signifies an equivalent of a non-chromophoric anion.

The invention provides a process for the production of compounds of formula I, which comprises (a) reacting a compound of formula II,

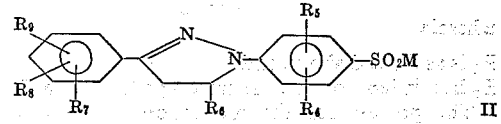

wherein $R_4$ to $R_9$ are as defined above, and M signifies an equivalent of a monovalent cation, with a compound of formula III,

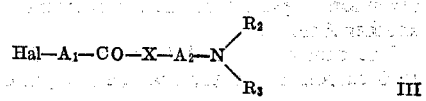

wherein $R_2$, $R_3$, $A_1$, $A_2$ and X are as defined above, and

Hal signifies chlorine, bromine or iodine, (b) forming a compound of formula I in which $A_1$ signifies

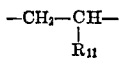

in which $R_{11}$ signifies hydrogen or lower alkyl, by reacting a compound of formula II with a compound of formula IV,

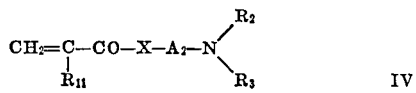

wherein $R_2$, $R_3$, $R_{11}$ and $A_2$ are as defined above, (c) reacting a compound of formula V,

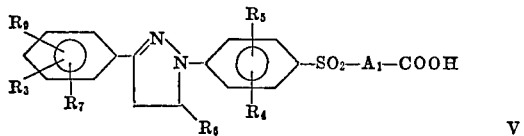

wherein $A_1$ and $R_4$ to $R_9$ are as defined above, or a functional derivative thereof, with a compound of formula VI,

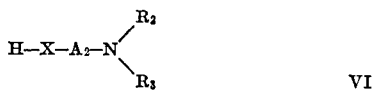

wherein

X, $A_2$, $R_2$ and $R_3$ are as defined above, or (d) reacting a compound of formula VII,

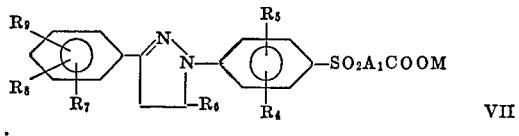

wherein $A_1$, M and $R_4$ to $R_9$ are as defined above, with a compound of formula VIII,

in which $A_2$, $R_2$ and $R_3$ are as defined above, and $E_1$ signifies a radical which is convertible into an anion$^\ominus$, to produce a a compound of formula I in which X is —O—, and where necessary, reacting the resulting compound with a compound of formula I
compound with a compound of formula IX,

   IX wherein $R_1$ is as defined above, and $E_2$ has, independently, the same significances as $E_1$.

The process for the production of the fundamental structure of the compounds of formula I is characterised by the above reactions, and conversions of one or more of the substituents coming under the above definitions into another substituent or substituents coming under the given definition is also included within the scope of this invention in particular the replacement of an anion$^\ominus$ by another Anion$^\ominus$.

The radicals $A_1$ and $A_2$ may contain, for example, 1 to 6 carbon atoms and may be straight or branched and may bear substituents, for example hydroxyl or alkoxy groups. The following radicals may be cited as examples:

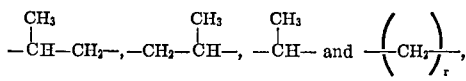

where r signifies an integer from 1 to 6. The radicals with 1 to 3 carbon atoms, in particular the radicals —$CH_2$— and —$CH_2$—$CH_2$—, are preferred.

The halogen atoms (substituents $R_4$, $R_5$, $R_7$, $R_8$ and $R_9$) may be, for example, fluorine or chlorine atoms.

The lower, optionally substituted alkyl radicals ($R_1$ to $R_9$, and the alkyl radicals of alkylthio and alkylsulphonyl groups, $R_7$ to $R_9$) contain, for example, 1 to 8 carbon atoms, may be straight or branched and may bear substituents such as chlorine or fluorine atoms, cyano, hydroxyl or alkoxy groups, or mononuclear aryl or aryloxy groups. The following radicals may be named as examples: methyl, ethyl, isopropyl, n- propyl, n-butyl, iso-butyl, sec. butyl, tert. butyl, n-amyl, isoamyl, sec. amyl, tert. amyl, n-hexyl, n-octyl, 2-ethylhexyl, tert. octyl, 2-chlorethyl, 2,2-difluorethyl, trifluoromethyl, cyanomethyl, 2-cyanethyl, 2-hydroxyethyl, 2- and 3-hydroxypropyl, 2-methoxy-, 2-ethoxy and 2-n-butoxy-ethyl, 3-methoxypropyl, 4-methoxybutyl, 2-(2'-methoxyethoxy)-ethyl, benzyl 2-phenylethyl, 2-phenoxyethyl. The alkyl groups are preferably unsubstituted and contain 1 to 5 carbon atoms. Methyl and ethyl are especially preferred.

Examples of suitable cycloalkyl radicals (substituent $R_2$) are cyclohexyl and methylcyclohexyl.

If $R_2$ and $R_3$ together with the nitrogen atom form a ring, this is preferably a piperidine or morpholine ring.

If $R_2$ and $R_{10}$ are bound to form a hydrocarbon bridge member, the radical

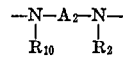

signifies preferably the piperazine radical

The lower, optionally substituted alkoxy radicals (substituents $R_4$, $R_5$, $R_7$, $R_8$ and $R_9$) may contain, for example, 1 to 8 carbon atoms, may be straight or branched and may themselves bear substituents such as hydroxyl or alkoxy groups or mononuclear aryl or aryloxy groups. The following radicals may be named as examples: methoxy, ethoxy, n-butoxy, n-amyloxy, n-octyloxy, 2-mehoxyethoxy, 2-hydroxyethoxy, 2-hydropropoxy, benzyloxy, 2-phenoxyethoxy. The alkoxy groups are preferably unsubstituted and contain preferably 1 to 5 carbon atoms. Methoxy is especially preferred.

The aryl radicals (substituents $R_2$, $R_7$, $R_8$ and $R_9$) may be, for example, dinuclear radicals such as naphthyl-1, naphthyl-2 and diphenylyl-4, or in particular mononuclear, optionally substituted aryl radicals such as phenyl, 2-, 3- or 4-methylphenyl, 2-, 3- or 4-chlorophenyl, 2- or 4-methoxyphenyl, 2- or 4-ethoxyphenyl, 4-fluorophenyl, 4-ethyl, 4-iso-propyl, 4-tert. butyl, 4-tert. amyl- or 4-tert. octylphenyl, 2,4- or 2,5-dimethylphenyl, 2-, 3- or 4-cyanophenyl, 2-, 3- or 4-aminocarbonylphenyl, 2-, 3- or 4-methylamino or -dimethylaminocarbonylphenyl, 2-, 3- or 4-methoxy-, -ethoxy-, -n-butoxy-, -benzyloxy-, -cyclohexyloxy-, -phenoxy- or -cresoxy-carbonyl-phenyl, 3- or 4-amino, -methylamino- or -dimethylamino-sulphonyl-phenyl, 3- or 4-methoxy, -ethoxy-, -n-butoxy-, -benzyloxy-, -cyclohexyloxy-, -phenoxy- or -cresoxy-sulphonylphenyl. The aryl radicals are, however, preferably radicals which are either unsubstituted or substituted by chlorine, methyl or methoxy.

In the substituent $R_6$ is an optionally substituted phenyl radical it may be substituted by chlorine, cyano, methyl or methoxy.

Optionally substituted carboxylic acid ester groups which are suitable as substituents $R_7$, $R_8$ and $R_9$ are, for example, carboxylic acid alkylester groups with 1 to 8 carbon atoms in the alkyl radical which may be substituted by alkoxy, phenyl or phenoxy radicals, carboxylic acid cycloalkylester groups and carboxylic acid arylester groups, preferably those of the naphthalene, diphenyl and and in particular the benzene series. Examples of such carboxylic acid ester groups are the methyl, ethyl, n-proply, isopropyl, n-butyl, iso-butyl, n-amyl, iso-amyl, n-hexyl, n-octyl, 2-ethylhexyl, 2-methoxyethyl, 2-ethoxyethyl, 2-n-butoxyethyl, 2-(2'-methoxy-ethoxy)-ethyl, 2-(2'-ethoxyethoxy)-ethyl, 2 - (2' - n - butoxyethoxy)-ethyl, benzyl, 2-phenylethyl, 2-phenoxyethyl, cyclohexyl, 4-methylcyclohexyl, 4-diphenylyl, naphthyl-1, naphthyl-2, phenyl, 2-, 3- and 4-methylphenyl, 2-, 3- and 4-chlorophenyl, 2- and 4-methoxyphenyl 2- and 4-ethoxyphenyl, 4-fluorophenyl, 2,4- and 2,5-dimethylphenyl, 4-n-butylphenyl, 4-tert. butylphenyl, 4-tert. amylphenyl, 4-tert. octylphenyl. The carboxylic acid ester groups are preferably alkyester groups in which alkyl has 1 to 5 carbon atoms; ethyl is especially preferred.

If the substituents $R_7$, $R_8$ and $R_9$ signify optionally substituted sulphonic acid ester groups they may suitably be a sulphonic acid ester group corresponding to the aforenamed carboxylic acid ester groups.

Substituted carboxylic acid amide groups and sulphonic acid amide groups which are suitable as substituents $R_7$, $R_8$ and $R_9$ are, for example, mono- and di-alkylamide, mono- and di-(hydroxyalkyl)-amide, alkoxyalkyl, alkoxyalkoxyalkyl, aryl, aralkyl, aryloxyalkyl, cycloalkyl and N-alkyl- and N-hydroxyalkyl-N-phenyl amide groups, in which alkyl and hydroxyalkyl may contain, for example, 1 to 8 or preferably 1 to 4 carbon atoms; alkoxyalkyl and alkoxyalkoxyalkyl contain preferably 3 to 6 or 5 to 8 carbon atoms respectively, and aryl and aryloxy may be dinuclear but preferably mononuclear. Specific examples are the methyl, ethyl, n-propyl, isopropyl, n-butyl, sec. butyl, iso-butyl, n-amyl, n-hexyl, iso-amyl, dimethyl, diethyl, di-n-butyl, 2-hydroxyethyl, 2- and 3-hydroxypropyl, 4-hydroxybutyl, di(2-hydroxyethyl), di-(2-hydroxypropyl), 2-methoxyethyl, 2 - ethoxyethyl, 2-n - butoxyethyl, 4-methoxybutyl, 2-(2'-methoxyethoxy)-ethyl, 2-(2'-ethoxyethoxy)-ethyl, 2-(2'-n-butoxyethoxy) - ethyl, phenyl, 2-, 3- and 4-methylphenyl, 2-, 3- and 4-chlorophenyl, 2- and 4-methoxyphenyl, 2- and 4- ethoxyphenyl, 4-tert. butyl-4-phenyl, 4-butylphenyl, 2,4- and 2,5-dimethylphenyl, 4-diphenylyl, naphthyl-1, naphthyl-2, N-methyl-N-phenyl, N-ethyl - N-phenyl, N-2-hydroxy - ethyl-N-phenyl, cyclohexyl, 4-methylcyclohexyl, benzyl, phenylethyl and phenoxyethyl amide groups of carboxylic and sulphonic acids. The carboxylic acid amide and sulphonic acid amide groups are, however, preferably unsubstituted.

Examples of suitable acylamino groups (substituents $R_7$, $R_8$ and $R_9$) are lower, optionally substituted alkanoyl ($C_1$–$C_8$) amino and alkoxy ($C_1$–$C_8$) carbonylamino groups and optionally substituted benzoylamino, phenylsulphonylamino and alkyl ($C_1$–$C_8$) sulphonylamino groups (acetylamino, propionylamino, butyrylamino, methoxy- and ethoxy-carbonylamino, 4-methyl- and 4-chlorobenzoylamino, phenylsulphonylamino, 4 - methylphenylsulphonylamino, methyl- and ethyl-sulphonylamino).

The substituent $E_2$ in compounds of formula IX is preferably a halogen atom (chlorine, bromine, iodine) or a sulphate, methyl sulphate or ethyl sulphate radical or a sulphonate radical (methane sulphonate, ethane sulphonate, benzene sulphonate, 4-methylbenzene sulphonate) or an alkanoate radical (acetate, propionate) or a benzoate radical.

The acid radicals $E_1$ may be, for example, radicals of sulphuric acid ($E_1$ signifies —O—$SO_3H$) or of a sulphonic acid ($E_1$ signifies —$SO_3R_{12}$ where $R_{12}$ represents an optionally substituted hydrocarbon radical), or preferably radicals of formic acid, acetic acid or hydrohalic acids ($E_1$ signifies Cl, Br etc.).

In the compounds of formula VIII halogen and in particular chlorine are especially preferred as substituent $E_1$. In formula IX the especially preferred significance of the substituent $E_1$ is sulphate, methyl sulphate or ethyl sulphate.

The substituent M may signify, for example, hydrogen or an equivalent of an alkali-metal, e.g. Na, K, Li, or of an alkaline-earth metal, e.g. Mg, Ca, Sr, Ba, or of another metal, e.g. Pb, Ag, etc., but M stands preferably for an alkali metal, of which sodium is the most economical.

The suitable functional derivatives of the carboxylic acids of formula V are, for example, the halides (chlorides, bromides), the anhydrides, the lower alkyl esters (methyl to butyl ester), the nitriles and the amides.

The non-chromophoric anion may be selected from organic or inorganic ions such as the formate, acetate, chloroacetate, propionate, oxalate, lactate, tartrate, benzoate, maleinate, chloride, bromide, iodide, perchlorate, methyl sulphate, ethyl sulphate, methyl sulphonate, sulphate, bisulphate, benzene sulphonate, 4-methyl benzene sulphonate or 4-chlorobenzene sulphonate ions. The water-soluble double salt compounds formed with inorganic salts such as zinc chloride are also suitable. If $R_1$ in the compounds of formula I signifies hydrogen, i.e. if the compounds are acid adducts, the Anion$^\ominus$ is preferably an acetate, formate, chloride or bisulphate anion.

In the compounds of formula I in which $n$ signifies 2 the anion may be replaced by another anion, for example by dissolving the compound in water or in an aqueous-organic medium and adding a silver salt, e.g. silver nitrate or acetate, if a halogen anion (Cl$^-$, Br$^-$, I$^-$) is to be replaced by another anion, e.g. a nitrate or acetate ion, or by adding a barium salt if another anion is to be introduced in place of a sulphate anion. This exchange can be effected in one or more steps, for example through the carbonate or the hydroxide or also with the aid of ion exchangers.

The preferred compounds of formula I are those in which the substituents $R_4$ and $R_5$ are hydrogen, chlorine, methyl or methoxy, the substituent $R_6$ is hydrogen, methyl or phenyl, and the substituents $R_7$, $R_8$ and $R_9$ are either three hydrogen atoms or two hydrogen atoms and one chlorine atom, one alkyl or alkoxy group with 1 to 5 carbon atoms, one cyano or phenyl group or one alkanoylamino or alkoxycarbonyl-amino group with 2 to 5 carbon atoms, preferably acetylamino, or one hydrogen atom and two chlorine atoms, or two alkoxy groups each with 1 to 5 carbon atoms. The preferred optionally substituted alkyl radicals $R_1$ are methyl, ethyl, n-propyl, iso-propyl, n-butyl, iso-butyl, n-amyl, iso-amyl or n-hexyl radicals, or 2-hydroxyethyl, 2-cyanoethyl, chloromethyl, 2-chloroethyl, aminocarbonylmethyl, benzyl or phenoxyethyl radicals. The substituent $R_{11}$ is preferably hydrogen or alkyl with 1 to 3 carbon atoms, preferably methyl. The substituent $R_{10}$ is preferably hydrogen or methyl.

In process variants a) and b), the reaction of a compound of formula II with a compound of formula III or IV is carried out in conventional manner for example in an inert organic solvent or in aqueous-organic medium at room temperature to 150° C., preferably at 50 to 120° C. It is expedient to react at the refluxing temperature of the mixture, and thus its boiling point is preferably below 120° C. Examples of suitable organic solvents are ethers (diethyl ether, di-iso-propyl ether, dioxan, 1,2-dimethoxyethane, 1,2-diethyloxyethane, methoxybenzene, ethoxybenzene), ketones (acetone, methyl ethyl ketone), halogenated alkanes (methylene chloride, chloroform), optionally halogenated or nitrated aromatic compounds (benzene, toluene, xylene, chlorobenzene, nitrobenzene), and alcohols (ethanol, ethoxy, ethanol). If, in the compound of formula II, M is hydrogen, a suitable acid binding agent, such as pyridine, should be used.

The reaction of a carboxylic acid of formula V or a functional derivative thereof with a compound of formula VI is also carried out in conventional manner.

For example, the esterification of a carboxylic acid of formula V with a compound of formula VI which is an alcohol (X signifies —O—), can be carried out, for example, as follows. The carboxylic acid is entered into a mixture of an alcohol of formula VI and an inert organic solvent, for example an optionally halogenated hydrocarbon (benzene, toluene, xylene, chlorobenzene, petroleum ether, chloroform, carbon tetrachloride) or an ether (diethyl ether, diisopropyl ether, dioxan, methoxybenzene, ethoxybenzene, 1,2-dimethoxyethane, 1,2-diethoxyethane) or into an excess of the alcohol itself. A catalyst is then added, which may be an acid such as sulphuric, phosphoric, methanesulphonic, ethanesulphonic, benzene sulphonic or toluenesulphonic acid, hydrogen chloride or hydrogen bromide gas, or an acid salt such as zinc chloride, and the esterification reaction continued to the end-point at temperatures of, for example, 0 to 200° C., under increased or reduced pressure as necessary and preferably under as nearly as possible anhydrous conditions, for example with azeotropic removal of the water formed in the reaction. The ester thus produced can be isolated by the normal methods, for instance by filtration with suction if it is in suspension, by precipitation with a suitable agent followed by filtration with suction, by evaporation or steam distillation of the solvent followed by filtration with suction, etc.

The reaction of a halide or an anhydride of a carboxylic acid of formula V with a compound of formula VI in which X signifies an —N(R$_{10}$)-group can be carried out, for example, at temperatures from 0 to 100° C. in an aqueous, aqueous-organic or organic medium, or in the excess of the amine employed provided it is liquid under the reaction conditions. Organic solvents suitable as medium for this reaction are solvents which are inert to the reactants under the reaction conditions, for example ethers (diethyl ether, di-iso-propyl-ether, dioxan, 1,2-dimethoxyethane, 1,2-diethoxyethane, methoxybenzene, and ethoxybenzene), ketones (acetone, methyl ethyl ketone), halogenated alkanes (methylene chloride, chloroform), optionally halogenated or nitrated aromatic compounds (benzene, toluene, xylene, chlorobenzene, nitrobenzene). The reaction is suitably carried out at a temperature of, 0 to 60° C. in aqueous-organic or organic medium and in the presence of an acid-binding agent (an alkali metal hydroxide, carbonate, bicarbonate or phosphate, calcium borate, magnesium oxide, pyridine, triethylamine) or in the excess of the amine. The group of formula

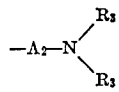

in the reaction product is capable of binding an equivalent of acid.

The halides of the carboxylic acids of formula V can be produced by conventional methods or in analogy to conventional methods, for example by treatment of the carboxylic acid with phosgene, oxalyl chloride, thionyl chloride, phosphorous oxychloride, phosphorus oxybromide, phosphorus trichloride or pentachloride, at, for example, room temperature to 150° C., optionally in the presence of an inert solvent and preferably in the presence of a catalyst such as pyridine.

A variant form of operation of the aforedescribed process for the reaction of a halide of a carboxylic acid of formula V with a compound of formula VI in which X signifies an —N(R$_{10}$)-group consists in producing the halide of the carboxylic acid of formula V in the reaction mixture itself by halogenation of the free acid and reacting it in the nascent state with a compound of formula VI in which X signifies an —N(R$_{10}$)-group. For this purpose, e.g., an inorganic acid chloride, for example an acid bromide or preferably an acid chloride may be used. Especially suitable inorganic acid chlorides are thionyl chloride, phosphorus trichloride and phosphorus oxychloride. Phosphorus pentachloride, phosphorus tribromide and phosphorus pentabromide are also well suitable. The reactants are conveniently suspended or dissolved in an inert organic solvent and the suspension or solution set with the inorganic acid chloride, in particular phosphorus trichloride or phosphorus pentachloride, at a temperature from about 0 to 50° C. It is of advantage to employ an excess of the amine, or in addition to the amine necessary for the reaction a tertiary base, for example pyridine, trimethyl amine or dimethyl aniline, in an amount sufficient to bind all the acid liberated during the reaction, i.e. at least 1 equivalent of amine and 1 equivalent of a tertiary base or at least 2 equivalents of amine in relation to 1 acid equivalent of the compound of formula V used for reaction. The condensation reaction of the carboxylic acid with the amine is then suitably carried out to the end-point at a temperature from about 0 to 100° C. Inert organic solvents especially suitably for the reaction are, for example, petroleum ether and other liquid aliphatic hydrocarbons and halogenated, in particular chlorinated, aliphatic hydrocarbons such as methylene chloride, chloroform, carbon tetrachloride and dichlorethane, aromatic, optionally halogenated or nitrated hydrocarbons such as benzene, toluene, xylene, chlorobenzene, nitrobenzene, and aliphatic, cyclic or aliphatic-aromatic ethers such as diethyl ether, diiso-propyl ether, dioxan, methoxybenzene, etc.

The reaction of a halide or anhydride of a carboxylic acid of formula V with a compound of formula VI in which X signifies —O— is suitably in the presence of an inert solvent and preferably in the presence of an acid-binding agent at a temperature from, for example, 0 to 150° C. The inert solvent may be selected, for example, from those which are suitable for the reaction of the halides of anhydrides of the carboxylic acids of formula V with compounds of formula VI in which X signifies an-N(R$_{10}$)-group. Examples of suitable acid-binding agents are inorganic compounds such as alkali metal alcoholates, hydroxides, carbonates and bicarbonates, alkaline-earth metal alcoholates, hydroxides, oxide and carbonates, and organic, preferably tertiary, amines such as trimethyl amine, which may be employed as a solution or a gas, triethyl amine, tri-n-butyl amine, pyridine, mixtures of pyridine bases, dimethylaminobenzene and diethylaminobenzene. The compound of formula VI is itself capable, by means of its basic group of formula

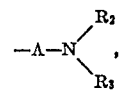

of binding one equivalent of acid. It is preferable to work with an inert organic solvent with the compound of formula VI alone at room temperature to about 100° C., or in the presence of an alkali-metal hydroxide or alcoholate or a tertiary amine such as pyridine in the temperature range of 0 to 40° C.

A methyl, ethyl or n-butyl ester of a carboxylic acid of formula V can be transesterified with an alcohol of formula VI (X signifies —O—) in the presence of an alkali-metal compound of the same alcohol as catalyst. For this reaction it is convenient to work with an excess of the alcohol in the presence of an alcoholate of the same alcohol at high temperature, preferably at 120 to 160° C., and optionally with distillation of the liberated alkanol. It is of advantage to add the catalyst in small portions and to use a quantitative ratio of about 0.025 mols of the alcoholate to 1 mol of the ester. The resulting compound can be isolated by conventional methods.

In process variant (d), the reaction of a compound of formula VII with a compound of formula VIII is carried out conveniently in an inert organic solvent at temperatures from room temperature to about 150° C., preferably at 40 to 120° C. The solvents named above for the esterification reaction are suitable, although the halogenated alkanes are preferably not used. The product may be isolated in conventional manner.

The suitable alkylating agents of formula IX are the normal quaternating agents, for example the esters of strong mineral acids and organic sulphonic acids, alkyl chlorides, alkyl bromides, alkyl iodides and aralkyl halides, the esters of lower alkanesulphonic acids, for example methane-, ethane- and butane-sulphonic acid, the esters of benzenesulphonic acids which may be further substituted, such as methyl, ethyl, propyl and n-butyl esters of benzenesulphonic acid, 2- and 4-methylbenzenesulphonic acid, 4-chlorobenzenesulphonic acid and 3- and 4-nitrobenzenesulphonic acid, methyl chloride, methyl bromide, methyl iodide, dimethyl sulphate, the methyl esters of lower alkanesulphonic acids or of benzenesulphonic acids.

The treatment with alkylating agent of formula IX can be carried out effectively at temperatures of 0 to 150° C., preferably at about 15 to 110° C., preferably in an inert solvent, for example an ether or ketone, an optionally halogenated or nitrated aromatic hydrocarbon, a lower alkanecarboxylic acid, or in particular in a lower alcohol such as methanol, optionally in the presence of water or in an excess of the alkylating agent.

In many cases the quaternary ammonium compounds produced separate from the reaction medium and can be filtered off with suction, washed and dried. Otherwise the solvent may be distilled or the reaction mixture diluted with a suitable agent such as petroleum ether to isolate the product.

The compounds of formulae II to VII are known or can be produced in analogy with known methods. The following publications from the relevant literature may be cited: "Organic Reaction," Vol. I, pp. 304–341 and Vol. 16; Olah, "Friedel-Crafts and Related Reactions," particularly Vol. III, Part 1; Kirk Othmer's "Encyclopaedia of Chemical Technology," Vol. 10, pp. 147–149; "The Chemistry of Heterocyclic Compounds," Vol. 22, pp. 177–278 (1967) Interscience publishers; and Houben-Weyl, "Methoden de organischen Chemie," 4th impression, Vol. IX, pp. 123–128 (1955).

The alkyl esters or nitriles of carboxylic acids of formula V in which $A_1$ signifies a bridge member of formula

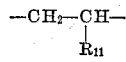

can be produced, for example, by the reaction of a compound of formula II in acid medium with an alkyl ester of formula X,

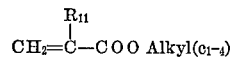    X or with a nitrile of formula XI,

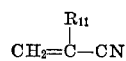    XI

The corresponding amides, the free acids and their metal salts can be obtained by saponification and, subsequent treatment as required, for example with a metal base in accordance with known methods.

The reaction of compounds of formula II with compounds of formula X or XI is carried out in an analogous manner to the reaction with a compound of formula IV.

The compounds of formula I possess optical brightening properties when applied to a wide variety of organic polymeric materials. By "organic polymeric materials" are understood plastics materials and natural fibres such as cotton and wool, but primarily synthetic fibre-forming polymers, including the types modified by the introduction of basic or acid groups, for example polyesters, polyamides, polyurethanes, polyolefins (polyethylene, polypropylene, modified polypropylene), polyvinyl acetate, polyvinyl chloride, polyvinylidene chloride, polyacrylonitrile, modified polyacrylonitrile, polystyrene, cellulose diacetate and cellulose triacetate.

The compounds of formula I can be applied by normal methods, for example in the form of solutions in organic solvents or as aqueous solutions or dispersions.

The compounds of formula I in which $n$ signifies 1 are especially suitable for the optical brightening of cellulose diacetate, cellulose triacetate and polyamide fibres from aqueous dispersion, while the compounds of formula I in which $n$ signifies 2 are particularly suitable for the optical brightening of polyacrylonitrile and acrylonitrile copolymer fibres from aqueous solution or in the melt prior to spinning. The compounds of formula I in which $n$ signifies 1 are also suitable for brightening polyacrylonitrile and acrylonitrile copolymer fibres, provided they are applied from an acid medium, i.e. when the corresponding acid adduct is present in the solution.

Acrylonitrile polymers generally consists of more than 80% of acrylonitrile, while acrylonitrile copolymers are generally composed of 80 to 95% acrylonitrile and 20 to 5% vinyl acetate, vinyl pyridine, vinyl chloride, vinylidene chloride or acrylic acid, acrylic ester, methacrylic acid, methacrylic ester etc.

The disclosed compounds can be applied in amounts ranging for example, from 0.001 to 0.5% or preferably 0.01 to 0.2% in relation to the weight of the material to be brightened and depending on the method of application. These compounds can be employed alone or in combination with other optical brightening agents or in a combination of two or more compounds of formula I, and may be in the presence of surface-active agents, such as detergents, and carriers.

The compounds have good light and wet fastness.

The following Examples illustrate the invention and the parts and percentages are by weight and the temperatures in degrees centigrade. The melting points are uncorrected.

EXAMPLE 1

8.55 Parts of 1-(4'-β-chlorocarbonylethylsulphonylphenyl)-3-(4''-chlorophenyl)-Δ²-pyrazoline, 2 parts of 2-dimethyl aminoethanol and 32 parts of acetone are mixed and in the mixture heated with reflux. It is then cooled and the precipitated hydrochloride filtered off with suction, washed with acetone and dried at 80°. The yield is 8 parts, the melting point 174–176°. On treatment of the crude product with boiling dioxane the pure hydrochloride of formula Ia,

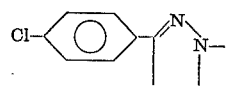
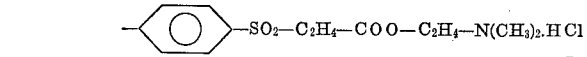

Ia is obtained, which melts at 187–189°.

EXAMPLE 2

A mixture of 17.1 parts of 1-(4'-sulphinophenyl)-3-p-chlorophenyl-Δ²-pyrazoline in the form of the sodium salt, 16.5 parts of N-(3'-dimethylaminopropyl) - chloroacetamide hydrochloride and 100 parts by volume of dioxan is held at the refluxing temperature for 1½ hours with stirring. The mixture is then cooled to room temperature and the dioxane separated from the lower oily layer. The oily layer is dissolved in 75 parts of water and the pH of the solution adjusted to 8.0 with 20% sodium carbonate solution. The solid substance settles out and is filtered off, washed with water recrystallized from "Cellosolve" (Trademark). After filtration, washing with dilute alcohol and drying at 70°, 11.35 parts of pale yellow crystals are obtained which melt at 210–212°. After recrystallization from dimethyl formamide the pure product, melting point 212–213°, is obtained, which has the formula Ib.

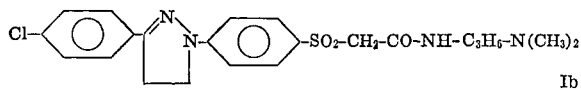

Ib

The following table specifies further compounds of formula Ic,

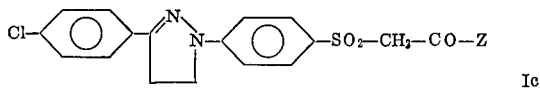

Ic which can be produced in analogy with the preceding Example and are distinguished by the significance of the radical Z.

TABLE 1

| Example | Z | Melting point, degree |
|---|---|---|
| 3 | —NHCH$_2$CH$_2$N(CH$_3$)$_2$ | 209–210 |
| 4 | —NHCH$_2$CH$_2$N(C$_2$H$_5$)$_2$ | 196.5–197.5 |
| 5 | —N(piperazine)N—CH$_3$ | 219–220 |
| 6 | —O—CH$_2$CH$_2$N(CH$_3$)$_2$ | 147–148 |

The starting product 1-(4'-sulphinophenyl)-3-p-chlorophenyl-Δ²-pyrazoline used in the form of the sodium salt in Example 2 can be produced as follows. 35.5 Parts of 1-(4'-chlorosulphonyl-phenyl)-3-p-chlorophenyl-Δ² - pyrazoline are stirred into 200 parts by volume of 2-ethoxyethanol at 25°, after which a solution of 25.3 parts of sodium sulphide (90% Na$_2$S) in 100 parts of water is added. The mixture is stirred for 15 minutes, during which time its temperature increases to 39° and a clear solution is formed. The solution is stirred for a further hour, by which time the temperature falls to 25° and the pyrazoline compound of formula XV,

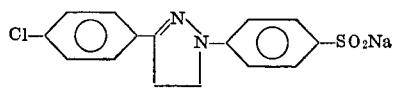

XV settles out in the form of pale yellow crystals. After filtration, washing with water and drying at 70°, 26 parts of the product with a melting point above 360° are obtained.

The hydrochloride of N-(3'-diethylaminoethyl)-chloracetamide used as starting product in Example 4 can be produced as follows. 22.6 Parts of chloracetyl chloride are stirred into 50 parts by volume of acetone. In 30 minutes 23.2 parts of 2-diethylaminoethylamine are added dropwise, after which the mixture is stirred further for 15 minutes at 20°. The solid compound of formula XVI,

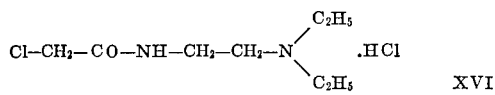

XVI is filtered off, washed with acetone and vacuum dried at 25°. 38.6 Parts of the white product, melting point 93–95°, are obtained.

The compounds listed in Table 2 below can be produced by the foregoing procedure and are suitable for the production of the compounds of Examples 2, 3, 5 and 6.

TABLE 2

| Formula | Compound | Appearance or melting point, deg. |
|---|---|---|
| (XVII) | ClCH$_2$CONH(CH$_2$)$_3$N(CH$_3$)$_2$·HCl | Oil |
| (XVIII) | ClCH$_2$COHN(CH$_2$)$_2$N(CH$_3$)$_2$·HCl | Oil |
| (XIX) | Cl—CH$_2$—CO—N(piperazine)N—CH·HCl | [1] 226–228 |
| (XX) | ClCH$_2$COOCH$_2$CH$_2$N(CH$_3$)$_2$·HCl | 106–108 |

[1] Decomposes.

EXAMPLE 7

3.43 Parts of 1-(4'-sulphinophenyl)-3-chlorophenyl-Δ²-pyrazoline in the form of the sodium salt, 3.81 parts of 4-methyl-N-acryl piperazine hydrochloride, 10 parts by volume of 95% ethanol and a solution of 1.56 parts of monosodium phosphate dihydrate in 10 parts of water are mixed and the mixture held for 1 hour at the refluxing temperature with stirring. It is then cooled and the pH adjusted to 8–9 with 20% sodium carbonate solution. The precipitated pyrazoline compound of formula Id,

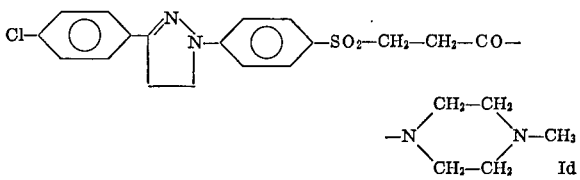

Id is filtered, washed with water and dried at 70°. This results in 4.2 parts of pale yellow crystals, melting point 191–194°, while reprecipitation from dimethyl formamide gives the pure product with melting point 195–196°.

The hydrochloride of 4-methyl-N-acrylyl piperazine used as starting product can be produced as follows. 8.62 Parts of N-methyl piperazine are added dropwise with stirring to a solution of 7.8 parts of acrylyl chloride in 50 parts by volume of acetone at 15–20°. On completion of the reaction the mixture is stirred for a further hour, then the precipitated product of formula XXII,

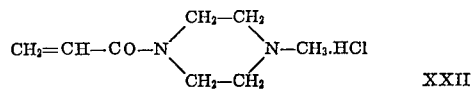

XXII is filtered and dried at 25° in vacuum. 13.3 Parts of white crystals are obtained, which melt at 146–150° with decomposition.

EXAMPLE 8

17.9 Parts of 1-(4'-β-carboxyethylsulphonylphenyl)-3-phenyl-Δ²-pyrazoline and 15 parts of phosphorus pentachloride are stirred into 74 parts by volume tetrachlorethane. During the exothermic reaction the temperature increases to 30°. When the temperature begins to sink again the reaction mixture is raised to 45° and held at this temperature for one hour. It is then cooled to 0° and the precipitated acid chloride filtered. The impure acid chloride is suspended in 50 parts by volume of toluene and the suspension added to 10 parts of dimethyl aminoethanol. The mixture is stirred, raised to 100° and held at this temperature for 10 minutes. It is then cooled to room temperature and filtered to eliminate the insoluble components. The toluene solution is diluted with an equal volume of petroleum ether (boiling range 40–60°), on which the pyrazoline compound of formula Ie,

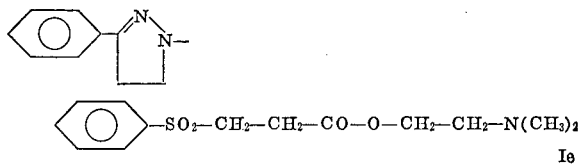

Ie settles out and is isolated by filtration. 13.6 Parts of white crystals, melting point 90–105°, are obtained. Recrystallization from aqueous acetone gives the pure product with melting point 119–120°.

EXAMPLE 9

20 Parts of 1-(4'-β-carboxyethylsulphonyl phenyl)-3-p-chlorophenyl-Δ²-pyrazoline are stirred into 121 parts by volume of perchlorethylene, with heating to the reflux temperature and the dropwise addition in 15 minutes of 7 parts of thionyl chloride. The mixture is held under reflux for a further 30 minutes, after which 10 parts by volume of perchlorethylene are distilled off at normal pressure. The reaction mixture is cooled to 50°, in 15 minutes 11.55 parts of 1-dimethyl aminopropan-2-ol are dropped in, then the temperature is raised to 60° and this temperature held for 1 hour. On cooling to room temperature the solid compound of formula If,

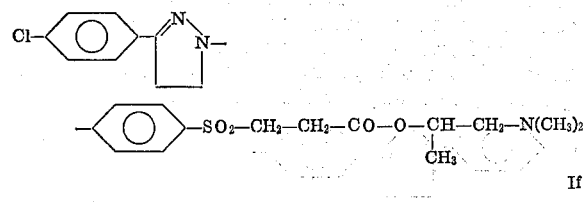

If is filtered off, washed thoroughly with water and dried at 50° in vacuum to give 18.42 parts of pale yellow crystals, melting point 114–116°. On recrystallization from benzene/petroleum ether (boiling range 60–80°) the pure product, melting point 121–122°, is obtained.

EXAMPLE 10

A mixture of 27.15 parts of 1-(4'-β-carboxyethylsulphonylphenyl)-3-p-chlorophenyl-Δ²-pyrazoline, 109 parts by volume of perchlorethylene and 20.9 parts of phosphorus pentachloride is raised to 70° and held at this temperature for 2 hours. On cooling to room temperature the acid chloride formed settles out. It is filtered and mixed with 100 parts by volume of perchlorethylene. In 10 minutes 15 parts of 1-dimethyl-aminopropan-3-ol are added with constant stirring at 50°. The reaction mixture is held at 50–60° for 1 hour and then cooled to room temperature, on which the solid compound of formula Ig,

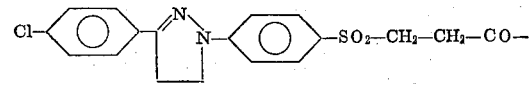

O—CH₂—CH₂—CH₂—N(CH₃)₂

Ig is filtered, washed thoroughly with water and dried at 50° in vacuum. 23.3 Parts of pale yellow crystals with melting point 122–125° are obtained. On recrystallization from carbon tetrachloride the pure product, melting point 126–128°, is obtained.

Further esters of the general formula Ih

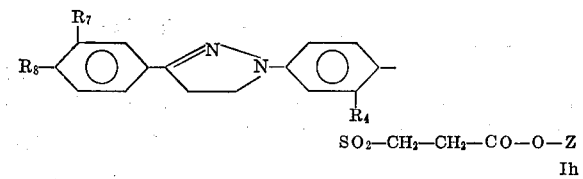

$SO_2-CH_2-CH_2-CO-O-Z$

Ih which can be produced in an analogous manner to the aforedescribed esters of Examples 8, 9 and 10 are listed in Table 3 below.

TABLE 3

| Example | Z | R₄ | R₈ | R₇ | Melting point, deg. |
|---|---|---|---|---|---|
| 11 | —CH₂—CH₂—N(CH₃)₂ | H | Cl | H | 126–127 |
| 12 | —CH₂—CH₂—N⟨C₅H₁₀⟩ | H | Cl | H | 119–122 |
| 13 | —CH₂—CH₂—N⟨C₄H₈O⟩ | H | Cl | H | 133–135 |
| 14 | —CH₂—CH₂—N(CH₂Ph)(CH₃) | H | Cl | H | 98–100 |
| 15 | —CH₂—CH₂—N(CH₃)₂ | H | Cl | Cl | 120–121 |
| 16 | —CH₂—CH₂—N(CH₃)₂ | H | —C₆H₅ | H | 169–171 |
| 17 | —CH₂—CH₂—N(CH₃)₂ | H | —OCH₃ | H | 89–91 |
| 18 | —CH₂—CH₂—N(CH₃)₂ | H | —SCH₃ | H | 108–108.5 |
| 19 | —CH₂—CH₂—N(CH₃)₂ | H | —SO₂CH₃ | H | 145–149 |
| 20 | —CH₂—CH₂—N(CH₃)₂ | H | —OCH₃ | —OCH₃ | 121–123 |
| 21 | —CH₂—CH₂—N(CH₃)₂ | —CH₃ | Cl | H | 89–91 |
| 22 | —CH₂—CH₂—N(CH₃)₂ | Cl | Cl | H | 96–98 |

EXAMPLE 23

The 1-(4'-β-carboxyethylsulphonyl phenyl)-3-phenyl-Δ²-pyrazoline used in Example 1 can be produced as follows. A mixture of 72.5 parts of 4-β-carboxyethyl sulphonyl phenyl hydrazine hydrochloride, 260 parts by volume of iso-propanol and 85 parts of water is prepared and its pH adjusted to 2–3 with 36% sodium hydroxide solution. The mixture is reacted at the refluxing temperature for 1 hour with constant stirring. After cooling to room temperature, the precipitated product of formula XXVII,

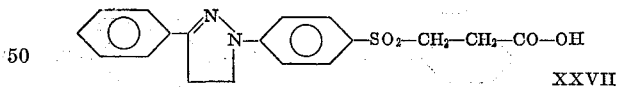

XXVII is filtered off. 65.2 Parts of pale yellow crystals with melting point 189–191° are obtained. On recrystallization from glacial acetic acid the pure acid, melting point 197–199°, is obtained.

Further acids of the general formula XXVIII

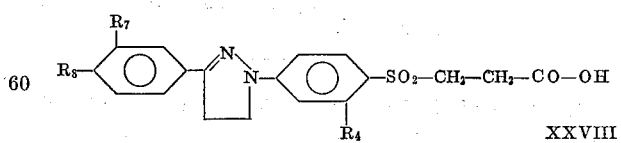

XXVIII which can be produced in analogy with this procedure and are suitable for use in Examples 9 to 21, are listed in the following Table.

TABLE 4

| Example | R₄ | R₈ | R₇ | Melting point, deg. |
|---|---|---|---|---|
| 24 | H | —Cl | —H | 228–230 |
| 25 | H | —Cl | —Cl | 210–213 |
| 26 | H | —C₆H₅ | —H | 194–198 |
| 27 | H | —OCH₃ | —H | 194–195 |
| 28 | H | —SCH₃ | —H | 182–184 |
| 29 | H | —SO₂CH₃ | —H | 262–263 |
| 30 | H | —OCH₃ | —OCH₃ | 224–226 |
| 31 | CH₃ | —Cl | —H | 232–234 |

EXAMPLE 32

The acid of formula XXIX

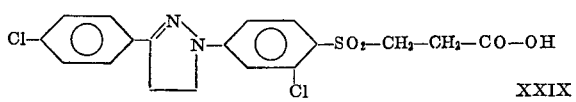

XXIX used for the synthesis of the pyrazoline compound of Example 22 can be produced as follows. 38.95 Parts of 1-(4'-chlorosulphonyl-3'-chlorophenyl)-3-$p$ - chlorophenyl - $\Delta^2$-pyrazoline (produced by reaction of 1-(4'-sulpho-3'-chlorophenyl)-3-$p$-chlorophenyl-$\Delta^2$-pyrazoline in the sodium salt form and thionyl chloride) are stirred into 200 parts by volume of sulpholan. In 30 minutes a solution of 25.3 parts of sodium sulphide in 100 parts of water is added dropwise with stirring, after which the mixture is stirred for a further 30 minutes. A solution of 18.7 parts of monosodium phosphate in 50 parts of water is added, followed by 20 parts of methyl acrylate, and the mixture stirred for 20 hours at room temperature. The compound of formula XXX,

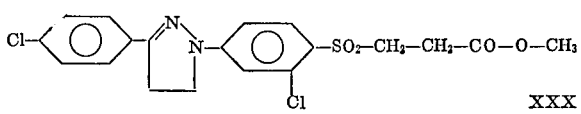

XXX settles out. After filtration 33.4 parts of pale yellow crystals with melting point 152–154° are obtained.

25 Parts of the ester of formula XXX are stirred into 150 parts by volume of glacial acetic acid and 25 parts by volume of concentrated hydrochloric acid. The mixture is stirred for 1 hour with reflux and cooled to room temperature. The acid of formula XXIC is filtered off in the form of pale yellow crystals with melting point 230–235° (23.2 parts). After recrystallization from 2-ethoxyethanol the pure acid, melting point 232–234°, is obtained.

EXAMPLE 33

A mixture of 12.33 parts of 1-(4'-$\beta$-chlorocarbonylethyl-sulphonylphenyl)-3 - $p$ - chloropenyl - $\Delta^2$ - pyrazoline, 7 parts of N-methyl piperazine and 100 parts by volume of perchlorethylene is prepared and raised to 60–70°. It is stirred at this temperature for 15 minutes and then cooled to room temperature, on which the amide of formula Ii,

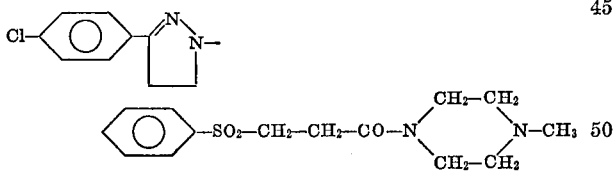

Ii settles out. The solid product is filtered, washed well with water and dried. 10.1 Parts of pale yellow crystals, melting point 171–173°, are obtained. On recrystallization from dimethyl formamide the pure product with melting point 194–196° is obtained.

EXAMPLE 34

A mixture of 12.33 parts of 1-(4'-$\beta$-chlorocarbonylethyl sulphonyl phenyl)-3-$p$-chlorophenyl-$\Delta^2$-pyrazoline, 5.82 parts of N,N-dimethyl ethylene diamine and 100 parts of perchlorethylene is stirred for 1 hour at room temperature. After filtration of the mixture the compound of formula Ij,

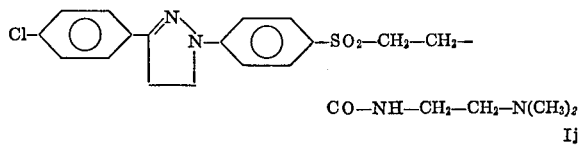

Ij is obtained as a pale yellow product, melting point 154–156° (8.1 parts). On recrystallization from toluene the pure amide, melting point 160–161°, is obtained.

EXAMPLE 35

A mixture of 10.28 parts of 1-(4'-$\beta$-chlorocarbonyl ethyl sulphonyl phenyl)-3-$p$-chlorophenyl-$\Delta^2$-pyrazoline, 7 2.55 parts of dimethyl aminopropylamine and 20 parts by volume of acetone is stirred for 1 hour at room temperature. After filtration the hydrochloride of formula Ik,

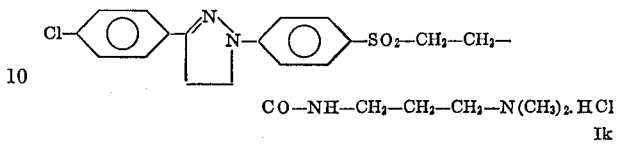

Ik melting point 120–125°, is obtained as solid residue. On reprecipitation from acetone the pure hydrochloride, melting point 125–130°, is obtained.

EXAMPLE 36

A mixture of 12.33 parts of 1-(4'-$\beta$-chlorocarbonyl ethyl sulphonyl phenyl)-3-$p$-chlorophenyl-$\Delta^2$-pyrazoline, 7 parts of 3-dimethylamino-1-propylamine and 100 parts by volume of perchlorethylene is stirred for 1 hour at room temperature. The mixture is filtered and the filter residue washed well with water. 9.2 Parts of the amide of formula Il,

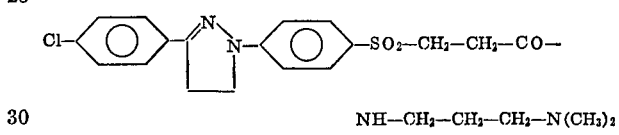

Il are obtained as a pale yellow, solid product, melting point 149–152°. On recrystallization from toluene, the pure compound with melting point 153–154° is obtained.

EXAMPLE 37

Two parts of the hydrochloride described in Example 1 are stirred into a solution of 0.34 parts of sodium bicarbonate in 20 parts of water, after which 0.4 parts by volume of dimethyl sulphate are added. The mixture is stirred for a further hour at room temperature, then raised to 60° and treated with activated carbon. Subsequent filtration gives a pale yellow solution which contains the quaternary methosulphate of formula Im,

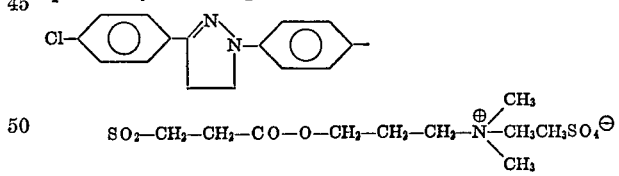

Im

Application Example A

100 Parts of a fabric of polyacrylonitrile fibre are entered at 40° into a solution of 4000 parts containing 0.3 parts of the compound of formula Ia and 30 parts of a 10% glacial acetic acid solution. The temperature is increased to 90° in 30 minutes and held at 90–95° for 1 hour. The fabric is removed, washed well with hot and then dried with cold demineralized water, and dried at 80°. A brilliant white effect is obtained in comparison with untreated fabric.

Application Example B

100 Parts of a fabric of cellulose triacetate fibre is bleached at 90–95° with a solution of 2 g./l. sodium chlorite buffered at pH 3.5 and then entered at 40° into 4000 parts of a solution containing 0.5 parts of the compound of formula Ia and 20 parts of a fatty alkyl polyglycol ether acetate. The solution is raised to 90° in 30 minutes and held at 90–95° for 30 minutes. The fabric is removed, rinsed well with demineralized water, and dried at 80°. A brilliant white effect is obtained on the cellulose triacetate fabric.

Application Example C

100 Parts of a polyacrylonitrile fabric are entered at 40° into 4000 parts of an aqueous solution containing 0.4 parts of the compound of formula Ia, 0.5 parts of sodium metabisulphite, 2 parts of sodium hexametaphosphate and 2 parts of oxalic acid. The bath is raised to 90° in 30 minutes and held at 90–95° for 1 hour. The fabric is removed, rinsed with hot and then with cold demineralized water and dried at 80°. It shows a much higher degree of whiteness than untreated fabric.

Application Example D

Five parts of a white fabric of "Courtelle" polyacrylonitrile fibre are entered at room temperature into 200 parts by volume of an aqueous solution containing 0.02 parts of the pyrazoline compound of Example 5, 0.2 parts of oxalic acid, 0.025 parts of sodium metabisulphite and 0.1 part of sodium hexametaphosphate. The bath is raised to 90° in 30 minutes and held at 90–100° for 1 hour, after which the fabric is removed, rinsed with hot and then with cold demineralized water, hydro-extracted and oven dried at 80°. A brilliant optical white of slightly violet shade is obtained on the polyacrylonitrile fabric.

Application Example E

Five parts of a white fabric of "Orlon 75" polyacrylonitrile fibre are entered at room temperature into an aqueous solution of 200 parts by volume set with 0.015 parts of the pyrazoline compound disclosed in Example 11 and 0.17 parts by volume of acetic acid. The pyrazoline compound is added to the bath in the form of a solution in 0.1% acetic acid. The temperature of the bath is raised to 90° in 30 minutes and held at 90–100° for 60 minutes. The fabric is then removed, rinsed with hot and then with cold demineralized water and dried in an oven at 80°. A brilliant optical white of slightly reddish shade is obtained.

Application Example F

Five parts of a bleached fabric of "Courtelle" polyacrylonitrile fibre are entered at room temperature into 200 parts by volume of an aqueous solution containing 0.2 parts of oxalic acid, 0.025 parts of sodium metabisulphite, 0.1 part of sodium hexametaphosphate and 0.02 parts of the pyrazoline compound of formula If. The pyrazoline compound is added to the bath in the form of a solution in 0.1% aqueous acetic acid. The fabric is mechanically agitated while the bath is raised in 30 minutes to 90° and is then treated for a further hour at 90–100° with continued agitation. On removal the fabric is rinsed in hot and then in cold demineralized water and dried in an oven at 80°. In comparison with untreated fabric the fabric is of a considerably more brillant apperance with a slightly reddish shade.

The results of treatments of polyacrylonitrile fabric with a number of the aforedescribed optical brightening agents are listed in the table below.

TABLE 5

| Application example | Compound Formula | Compound Example | Shade of optical white effect on polyacrylonitrile fabric |
|---|---|---|---|
| G | Ie | 8 | Reddish. |
| H | Ig | 10 | Slightly reddish. |
| I | Ih | 12 | Do. |
| J | Ih | 13 | Do. |
| K | Ih | 14 | Neutral. |
| L | Ih | 15 | Slightly greenish. |
| M | Ih | 16 | Do. |
| N | Ii | 33 | Neutral. |
| O | Ii | 34 | Slightly reddish. |
| P | Ik | 35 | Do. |
| Q | Il | 36 | Do. |
| R | Im | 37 | Do. |

Application Example S

Five parts of a fabric of "Dicel" cellulose diacetate fibre are entered at room temperature into 200 parts by volume of an aqueous solution containing 0.025 parts of the pyrazoline compound of Example 12. The temperature of the bath is increased to 80° in 15 minutes and this temperature is held for a further 30 minutes, after which the fabric is removed, rinsed well with cold water and dried in an oven at 80°. A pronounced optical white effect is obtained on the fabric.

Application Example T

Five parts of a fabric of "Tricel" cellulose triacetate fibre bleached with sodium chlorite are entered into a solution of 0.025 parts of the pyrazoline compound of formula If in 200 parts by volume of 0.0125% aqueous acetic acid solution. The temperature of the bath is increased to 90° in 30 minutes, after which it is removed, rinsed well with cold water and dried in an oven at 80°. The treated fabric is optically brightened in a brilliant, slightly reddish shade.

What is claimed is:
1. A compound of the formula

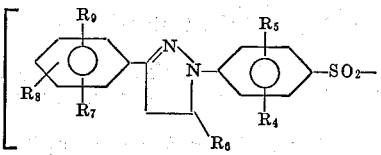

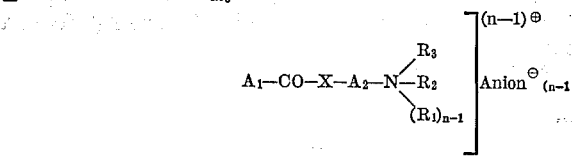

wherein
$A_1$ and $A_2$, independently, are alkylene of 1 to 3 carbon atoms,
$X$ is —O— or

wherein $R_{10}$ is hydrogen or lower alkyl,
$R_1$ is hydrogen or substituted or unsubstituted alkyl,
$R_2$ is substituted or unsubstituted alkyl, cyclohexyl, methylcyclohexyl, or substituted or unsubstituted phenyl, or when $X$ signifies

$R_2$ and $R_{10}$ together with $A_2$ and the two attached nitrogens form a piperazine ring,
$R_3$ is substituted or unsubstituted alkyl, or
$R_2$ and $R_3$ together with the nitrogen atom form a piperidine or morpholine ring,
$R_4$ and $R_5$ are, independently, hydrogen, halogen, substituted or unsubstituted alkyl, or alkoxy,
$R_6$ is hydrogen, substituted or unsubstituted alkyl or substituted or unsubstituted phenyl,
$R_7$, $R_8$ and $R_9$ are, independently, hydrogen; halogen; substituted or unsubstituted alkyl, alkylsulphonyl, alkylthio, or phenyl; alkoxy; cyano; carboxylic or sulphonic acid amide or ester; or acylamino;
$n$ is 1 or 2, and
Anion $\ominus$ signifies an equivalent of a non-chromophoric anion
provided that in the foregoing definitions any alkyl moiety contains 1 to 8 carbon atoms unless otherwise specified; any substituent on substituted alkyl or on the alkyl moiety of alkylthio or alkylsulphonyl is halogen, phenyl, phenoxy, alkoxy of 1 to 4 carbon atoms, hydroxyl or cyano, any substituent on substituted phenyl is methyl, chloro, or methoxy;
any carboxylic or sulphonic acid ester is an alkyl ester wherein the alkyl group contains 1 to 5 carbon atoms; any acyl portion of an acylamino group is alkanoyl of 1 to 8 carbon atoms or alkoxycarbonyl of 2 to 9 carbon atoms; benzoyl; chloro- or methylbenzoyl;

phenylsulphonyl, methylphenylsulphonyl; methylsulphonyl; or ethylsulphonyl, and
any halogen is chloro or fluoro.

2. A compound according to Claim 1 wherein
$R_{10}$ signifies a hydrogen atom or an alkyl radical of 1 to 3 carbon atoms,
$R_1$ is hydrogen or alkyl of 1 to 5 carbon atoms,
$R_2$ is alkyl of 1 to 5 carbon atoms, or benzyl,
or when X signifies —N($R_{10}$)—, $R_2$ and $R_{10}$ together with $A_2$ and the nitrogen atoms form a piperazine ring,
$R_3$ is alkyl of 1 to 5 carbon atoms,
or
$R_2$ and $R_3$ together with the nitrogen atom form a piperidine or morpholine ring,
$R_4$ is hydrogen, chlorine, methyl or methoxy,
$R_5$ is hydrogen,
$R_6$ signifies hydrogen or methyl, and
Anion $\ominus$ signifies an equivalent of an ion selected from chloride, formate, acetate, bisulphate, sulphate, methylsulphate and ethylsulphate.

3. A compound according to Claim 1 wherein any alkyl is methyl or ethyl.

4. A compound according to Claim 3 wherein $R_1''$, $R_2''$, $R_3''$, $R_7''$, $R_8''$, $R_9''$, and $R_{10}''$ when alkyl are methyl or ethyl.

5. A compound according to Claim 4 wherein $R_{10}''$ is hydrogen or methyl or together with $R_2''$ and $A_2''$ forms a piperazine ring.

6. A compound of formula $$\left[ R_9'' \underset{R_8''}{\overset{R_5''}{\underset{R_7''}{\diagdown}}} \diagup \underset{R_6''}{\overset{N-N}{\diagup}} \diagdown \underset{R_4''}{\diagup} SO_2 - A_1'' - CO - X'' - A_2'' - N \underset{(R_1'')_{n-1}}{\overset{R_3''}{\diagdown}} \right]^{(n-1)\oplus} \text{Anion}'^{\ominus}(n-1)$$

wherein n is as defined in Claim 1,
$A_1''$ and $A_2''$, independently, each signifies a straight or branched chain alkylene radical of 1 to 3 carbon atoms,
$X''$ signifies —O— or —N($R_{10}''$)—,
wherein
$R_{10}''$ signifies a hydrogen atom or an alkyl radical of 1 to 3 carbon atoms,
$R_1''$ signifies hydrogen or alkyl of 1 to 5 carbon atoms,
$R_2''$ signifies alkyl of 1 to 5 carbon atoms, or benzyl,
or when X signifies —N($R_{10}''$)—, $R_2''$ and $R_{10}''$ together with $A_2''$ and the nitrogen atoms form a piperazine ring,
$R_3''$ signifies alkyl of 1 to 5 carbon atoms,
or
$R_2''$ and $R_3''$ together with the nitrogen atom form a piperidine or morpholine ring,
$R_4''$ signifies hydrogen, chlorine, methyl or methoxy,
$R_5''$ signifies hydrogen,
$R_6''$ signifies hydrogen or methyl,
$R_7''$, $R_8''$ and $R_9''$ signify three hydrogen atoms, two hydrogen atoms and one chlorine atom, one alkyl, alkylthio, alkoxy or alkylsulphonyl group wherein the alkyl radical is of 1 to 5 carbon atoms, one cyano group, one phenyl group or one alkanoylamino or alkoxycarbonylamino group of 2 to 5 carbon atoms, or one hydrogen atom and two chlorine atoms or two alkoxy groups of 1 to 5 carbon atoms, and Anion'$\ominus$ signifies an equivalent of an ion selected from chloride, formate, acetate bisulphate, sulphate, methylsulphate, and ethylsulphate.

7. The compound according to Claim 1, of the formula,

Cl—⟨○⟩—N=N—⟨○⟩—
         └──────┘
$SO_2-CH_2-CH_2-CO-O-CH_2-CH_2-N(CH_3)_2$

8. The compound according to Claim 1, of the formula,

Cl—⟨○⟩—N=N—⟨○⟩—
         └──────┘
$SO_2-CH_2-CH_2-CO-O-\underset{\underset{CH_3}{|}}{C}H-CH_2-N(CH_3)_2$ 9. The compound according to Claim 1, of the formula, Cl—⟨○⟩—N=N—⟨○⟩—
         └──────┘
$SO_2-CH_2-CH_2-CO-O-CH_2-CH_2-CH_2-N(CH_3)_2$ 10. The compound according to Claim 1, of the formula, Cl—⟨○⟩—N=N—⟨○⟩—
         └──────┘
$SO_2-CH_2-CH_2-CO-N\underset{CH_2-CH_2}{\overset{CH_2-CH_2}{\diagup\diagdown}}N-CH_3$ 11. The compound according to Claim 1, of the formula, Cl—⟨○⟩—N=N—⟨○⟩—
         └──────┘
$SO_2-CH_2-CH_2-CO-NH-CH_2-CH_2-N(CH_3)_2$ 12. The compound according to Claim 1, of the formula, Cl—⟨○⟩—N=N—⟨○⟩—
         └──────┘
$SO_2-CH_2-CH_2-CO-NH-CH_2-CH_2-CH_2-N(CH_3)_2$

References Cited
UNITED STATES PATENTS

| | | | |
|---|---|---|---|
| 3,690,947 | 9/1972 | Rosch et al. | 117—33.5 T |
| 3,560,485 | 2/1971 | Schinzel et al. | 260—239.8 |
| 3,378,389 | 4/1968 | Schellhammer et al. | 117—33.5 |
| 3,629,241 | 12/1971 | Krause et al. | 260—239.9 |

FOREIGN PATENTS

| | | | |
|---|---|---|---|
| 1,204,953 | 9/1970 | Great Britain | 260—310 D |

HENRY R. JILES, Primary Examiner
C. M. S. JAISLE, Assistant Examiner

U.S. Cl. X.R.

117—33.5; 252—301.2; 260—239.8, 239.9, 239.65